(12) United States Patent
Lang et al.

(10) Patent No.: US 11,898,743 B2
(45) Date of Patent: Feb. 13, 2024

(54) LIGHTING SYSTEM FOR DYNAMIC LIGHTING CONTROL

(71) Applicant: LEDVANCE GmbH, Garching bei Munchen (DE)

(72) Inventors: Dieter Lang, Bruckmul (DE); Enzo Peres, Munich (DE); Timo Weinert, Muldorf am Inn (DE)

(73) Assignee: LEDVANCE GMBH, Garching bei Munchen (DE)

( * ) Notice: Subject to any disclaimer, the term of this patent is extended or adjusted under 35 U.S.C. 154(b) by 109 days.

(21) Appl. No.: 17/590,405

(22) Filed: Feb. 1, 2022

(65) Prior Publication Data
US 2022/0159802 A1  May 19, 2022

Related U.S. Application Data (63) Continuation of application No. 16/355,224, filed on Mar. 15, 2019, now Pat. No. 11,240,889.

(30) Foreign Application Priority Data

Mar. 15, 2018  (DE) .......................... 102018106089.0

(51) Int. Cl.
| | |
|---|---|
| *F21V 9/00* | (2018.01) |
| *H05B 47/16* | (2020.01) |
| *H05B 45/20* | (2020.01) |
| *G06F 3/0488* | (2022.01) |
| *G06F 3/0482* | (2013.01) |
| *H05B 47/19* | (2020.01) |

(52) U.S. Cl.
CPC .............. *F21V 9/00* (2013.01); *G06F 3/0482* (2013.01); *G06F 3/0488* (2013.01); *H05B 45/20* (2020.01); *H05B 47/16* (2020.01); *H05B 47/19* (2020.01)

(58) Field of Classification Search
CPC ........................................................ F21V 9/00
USPC ......................................................... 315/360
See application file for complete search history.

(56) References Cited

U.S. PATENT DOCUMENTS

| | | | |
|---|---|---|---|
| 9,655,215 B1 | 5/2017 | Ho et al. | |
| 9,674,917 B1* | 6/2017 | Sooch | H05B 47/115 |
| 9,795,000 B1 | 10/2017 | Sooch et al. | |
| 9,900,957 B2 | 2/2018 | van de Ven et al. | |
| 10,009,978 B2* | 6/2018 | Blum | H05B 45/20 |
| 2008/0164823 A1* | 7/2008 | Huang | H05B 45/20 |
| | | | 315/309 |
| 2011/0254445 A1 | 10/2011 | Bachhuber | |
| 2014/0070707 A1 | 3/2014 | Nagazoe | |
| 2014/0104321 A1 | 4/2014 | Steffy | |

(Continued)

FOREIGN PATENT DOCUMENTS

| | | |
|---|---|---|
| DE | 102010015518 A1 | 10/2011 |
| DE | 102014116531 A1 | 12/2016 |

(Continued)

*Primary Examiner* — William Hernandez
(74) *Attorney, Agent, or Firm* — Hayes Soloway PC (57) ABSTRACT

A lighting system has at least one light fixture and a control device. The at least one light fixture has light parameters. The control device is in communication with the at least one light fixture. The control device has a plurality of one-dimensional user setting, a predetermined sequence of light parameters as a function of time, and an adjustment to the predetermined sequence as a function of a selected one-dimensional user setting.

17 Claims, 8 Drawing Sheets

(56) References Cited

U.S. PATENT DOCUMENTS

| | | | |
|---|---|---|---|
| 2016/0295658 A1 | 10/2016 | Chraibi et al. | |
| 2017/0290116 A1 | 10/2017 | Bruwer | |
| 2018/0014384 A1 | 1/2018 | Charlton | |
| 2019/0281675 A1* | 9/2019 | Scott | H05B 47/115 |
| 2019/0289703 A1 | 9/2019 | Lang et al. | |
| 2021/0014953 A1 | 1/2021 | Lang et al. | |

FOREIGN PATENT DOCUMENTS

| | | |
|---|---|---|
| WO | 2015040036 A1 | 3/2015 |
| WO | 2016058849 A1 | 4/2016 |
| WO | 2016199101 A2 | 12/2016 |

\* cited by examiner

LIGHTING SYSTEM FOR DYNAMIC LIGHTING CONTROL

CROSS-REFERENCE TO RELATED APPLICATIONS AND PRIORITY

This patent application is a Continuation of U.S. patent application Ser. No. 16/355,224, filed on Mar. 15, 2019, which claims the benefit of and priority to German Patent Application No. 102018106089.0, filed on Mar. 15, 2018. Each of these patent applications is herein incorporated by reference in its entirety.

TECHNICAL FIELD

The present disclosure relates to a lighting system for dynamic lighting control.

BACKGROUND

Lighting systems which allow a dynamic lighting control are used in connection with human-centric lighting. In this case, in particular, the brightness and light color of lamps, lights or lighting systems are time-controlled.

In general, light dynamics are obtained which are oriented towards the natural course of daylight, characterized by bright light with a cold white light color (similar to daylight) in the daytime and a reduced brightness with a warm white light color in the evening and at night.

The time control usually takes place with times permanently programmed in and associated values for setting the brightness and light color. Interpolation between these specified values is performed according to a computation process in order to produce gradual and for the user imperceptible transitions.

In some systems the permanently programmed times can be adapted manually or automatically as a function of the season and geographic location, by astronomical calculations or contained tables (for example for sunrise and sunset).

For special requirements it is possible to deviate from the predetermined dynamics by user interventions, by selecting specific scenes, for example a scene with reduced brightness for viewing video presentations in schools or in conference rooms. Another example is a "Christmas mood" with low brightness and very warm white lighting with the intention of creating a pleasant atmosphere. These special scenes are generally static. The dynamics which is expedient from the biological point of view is switched off as a result.

The possibilities described above for intervention by the user by selection of predetermined scenes are generally insufficient and must be in the individual case, which is associated with considerable effort during start-up or later adaptation.

A free possibility of intervention by the user with the possibility of changing the brightness and color temperature of the lighting system is not expedient in general, since the user does not have the necessary specialist knowledge to select from the plurality of adjustment options those which correspond to the respective situation or the individual needs of the user.

It may even happen that out of lack of knowledge the user sets light situations which, although they are consistent with his wishes, but are negative with regard to their effects on the user from the biological point of view. This may be, for example, a light situation in which a very bright and cold white lighting is set at night. Frequently such possibilities are not used at all or are incorrectly used, because the users are not familiar with the operating concept or are overburdened by it. In most cases a deeper understanding of the technical operation of the lighting system or an understanding of the visual and non-visual effects of light, which the user does not have, is necessary in order to use a dynamic lighting system correctly.

Designers and installers are frequently overburdened with the planning and commissioning, because complex programming tasks are to be performed on light control systems, whilst the user requirements are frequently unclear in detail. Furthermore, the wish to be able to change even predetermined settings is often only apparent to the user when using the system.

SUMMARY

Starting from the known prior art, it is an object of the present disclosure to provide an improved lighting system.

The object is achieved by a lighting system with the features of the independent claims. Advantageous further embodiments are set out in the subordinate claims.

Accordingly, a lighting system is proposed, comprising one or more light fixtures and a control device for adapting light parameters of the light fixture in operation. In this case, light parameters can be, in particular, the intensity and/or the color temperature of the light emitted by the light fixture in operation. The term "intensity" is used here and in the following as a collective term for lighting parameters such as, for example, brightness, illumination intensity, or light density. For simplicity, if a fixture reference is made below to a plurality of light fixtures, a lighting system according to the disclosure can also have only one light fixture. Since a given intensity of the light emitted by the light fixture in a given installation leads to an unambiguous distribution of the illumination intensity in space, the terms "intensity," "brightness," and "illumination intensity" are used interchangeably in the following.

A light parameter can also be a variable transmission characteristic of a light source, for example the transmission direction or a variable transmission angle. This is not described in greater detail below, but can be discussed by analogy with illumination intensity or color temperature.

The light fixture can be connected to the control device by a cable and/or wirelessly (for example WLAN, Bluetooth, ZigBee, Z-Wave or by other protocols). A mixed connection (partially by cable, partially wireless) is also possible.

The control device is configured to adapt the light parameters in a time-dependent manner according to one or more predetermined sequences of the light parameters. In particular, in the course of a day the intensity and/or the color temperature of the light can be subject to change. For example, the control device can control the light fixture so that in the morning and in the evening it emits light of lower intensity and/or with a lower color temperature (for example warm white) and in the daytime it emits light of high intensity and/or with a high color temperature (for example cold white, similar to daylight). Likewise, for example, in the daytime a light fixture can illuminate relatively large areas by its orientation and/or its transmission angle, while in the evening only individual objects are illuminated in a targeted manner.

In this case, the light fixtures can be controlled, individually or combined in groups, so that different sequences can also be predetermined for different light fixtures and different groups of light fixtures.

The following description applies correspondingly, for example, to an individual predetermined sequence for a light fixture or a group of light fixtures, alongside which other sequences are also possible for other light fixtures. Thus, the control device can facilitate predetermination of one or also several sequences; for example, to define different sequences for lights on ceilings than for lights which illuminate walls.

Furthermore, the control device is configured to receive a one-dimensional user setting and to change the sequence of the light parameters according to the one-dimensional user setting. In this case a one-dimensional user setting is understood to be an individual parameter, the value of which lies between a lower limit value and an upper limit value. For example, the value of the one-dimensional user input can be between 0 and 1, alternatively between 0 and 100, further alternatively between −100 and +100. Preferably, a value in the value range of the one-dimensional user setting (for example a setting of 0) corresponds to the situation where the predetermined sequence of light parameters remains unchanged. For all other settings, the value of the user setting determines how far the changed sequence deviates from the predetermined configuration. Thus, the user does not have to change individual light parameters but determines the changes to the light parameters functionally derived from the individual light parameters with the change to a setting parameter.

Several different sequences for different light fixtures can also be changed by the same user setting.

According to the disclosure, in response to an input of a one-dimensional user setting the control device does not directly change the current values of the light parameters, that is to say not the current brightness and the current color temperature, but according to preset specifications it changes the sequence of the light parameters from the predetermined sequence to a changed sequence and thus also affects the sequence thereof in the future. This can then also lead to the current values of the light parameters being adapted accordingly, when the changed sequence for the current time provides different values for the light parameters than the originally predetermined sequence.

For example, an increase in the one-dimensional user setting can lead to an increase in both the intensity and also the color temperature. Thus, the light becomes brighter and "colder". Correspondingly, a reduction in the one-dimensional user setting can lead to a reduction in both the intensity and also the color temperature. Thus, the light becomes darker and "warmer". Due to such a setting of the light parameters in accordance with one single value, the operation of the lighting system can be simplified for a user. It is also possible to prevent the user from selecting unsuitable combinations of values for the light parameters.

The lighting system preferably has an input device connected to the control device for input of the one-dimensional user setting. The input device can be a direct input device, for example a switch, a knob or a slider. The direct input device can be a mechanical input device. The direct input device can also have a display device, on which one or more input elements corresponding to a mechanical input device are displayed. Such a display device is preferably touch-sensitive. However, on a touch-sensitive display device one or more input elements can be displayed which have no equivalent in a mechanical input device. A mixed display is also possible. The input device can be connected to the control device by cable and/or wirelessly (for example WLAN, Bluetooth, ZigBee, Z-Wave or by other protocols). The input device can also be configured to display a measure of the change in the sequence of the light parameters on the display device. This can take place for example by a graphical representation of the value of the one-dimensional user setting. A graphical representation of the effect of the selected one-dimensional user setting on the light parameters can also take place. Furthermore, a representation of specific thresholds of the value of the one-dimensional user setting (for example in the form of words) can also take place.

The input device can also be an application running on a computer (in particular a desktop computer, laptop computer, smartphone, tablet or other mobile devices). The application can represent one or more input elements on a display device of the computer, as described above.

In an embodiment, the control device is further configured to change the predetermined sequence of the light parameters corresponding to further input values. Further input values here are input values which are not input by a user. The further input values can be determined, for example, by the control device itself (for example by internal sensors or by computation from already known parameters). The control device can receive the further input values also from other components, in particular from external sensors.

Examples of further input values are the date, the time, the presence of persons in the region which is illuminated by the light fixtures. For example, the intensity of the illumination can be decreased when no persons are present.

Also, when further input values are taken into consideration, the current values of the light parameters, for example the current brightness and the current color temperature, are not changed directly, but according to preset specifications the sequence of the light parameters is changed from the predetermined sequence to a changed sequence. This can then also lead to the current values of the light parameters being adapted accordingly, when the changed sequence for the current time provides different values for the light parameters than the originally predetermined sequence.

In an embodiment, the control device is further configured to change the predetermined sequence of the light parameters in a non-linear manner with the one-dimensional user setting. For example, in the event of a change in the one-dimensional user setting to higher setting values, the intensity is changed relatively more significantly than the color temperature, while in the event of changes to lower setting values the color temperature is changed relatively more significantly than the intensity.

In an embodiment, the control device is further configured to take into consideration maximum and/or minimum values for the light parameters when changing the sequence of the light parameters. In other words, a predetermined sequence of maximum and/or minimum values for the light parameters can be provided and the control device can ensure that the changed sequence of the light parameters is not above the predetermined sequence of maximum values and/or not below the predetermined sequence of minimum values.

In particular, the maximum and/or minimum values can depend upon time parameters and/or parameters other than time parameters. As an example of time parameters, the maximum value of the intensity and/or the color temperature in the morning and/or in the evening can be lower than in the daytime. This may prevent settings by the user which, for example, run counter to the circadian rhythm.

In an embodiment, the control device is further configured to reset the predetermined sequence of the light parameters after a predetermined first time period to the predetermined sequence of the light parameters. Thus, it can be ensured that carried out changes made by the user to the sequence of the light parameters are automatically reversed again after the first time period. The first time period can have a constant duration. The first time period can also have different durations depending upon the change made. For example, minor changes to the sequence of the light parameters can be maintained for a longer length of time than major changes.

The resetting of the changed sequence of the light parameters to the predetermined sequence of the light parameters after the expiry of the predetermined first time period can take place suddenly or continuously over a predetermined second time period.

In one embodiment the control device is further configured to retain the changed sequence of the light parameters even after the switching off and on again of the light fixture(s) if there is at least one predetermined third time period between the switching off and on again. Thus, in the event of a short departure from the area illuminated by the light fixtures, the light fixtures are switched off without the change carried out being lost when switching on again. On the other hand, the third time period can be selected so that after switching off and switching on again after half an hour or the next day the sequence of the light parameters is again reset to the predetermined sequence, so that the user does not have to be concerned about whether a changed sequence of the light parameters might still be set.

BRIEF DESCRIPTION OF THE DRAWINGS

Preferred further embodiments of the disclosure are explained in greater detail by the following description of the drawings. In the drawing.

DETAILED DESCRIPTION OF THE DRAWINGS

Preferred exemplary embodiments are described below with reference to the drawings. In this case elements which are the same, similar, or act in the same way are provided with identical reference numerals in the different drawings, and repeated description of some of these elements is omitted in order to avoid redundancies.

Figure 1:
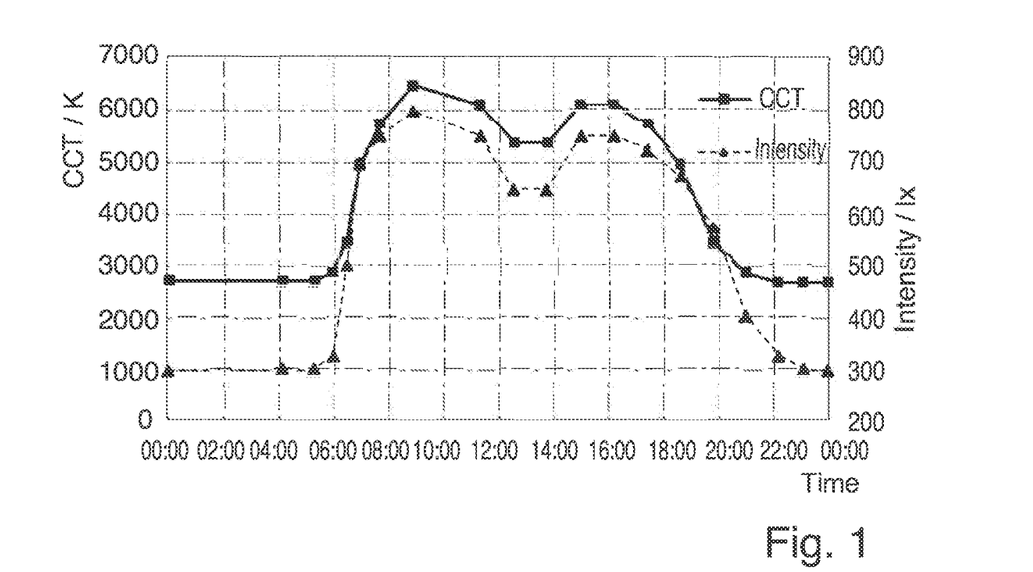
FIG. 1 shows a predetermined sequence for intensity and color temperature.

FIG. 1 shows a predetermined sequence for intensity and color temperature (CCT, correlated color temperature). On the basis of these predetermined sequences, a control device of a lighting system can automatically and dynamically (with time control) set the intensity and color temperature of the light fixtures belonging to the lighting system so that an advantageous illumination in terms of human-centric lighting is produced.

The definition of the dynamics takes place by predetermination of specific support points which, at defined times t corresponding to the time of day, predetermine associated values for illumination intensity ("illumination intensity" and "intensity of the light" are used interchangeably below) and color temperature. For times between the defined support points, intermediate values can be automatically interpolated by the control device, so that uniform transitions from one support point to the next are possible which are imperceptible to the user.

Figure 2:
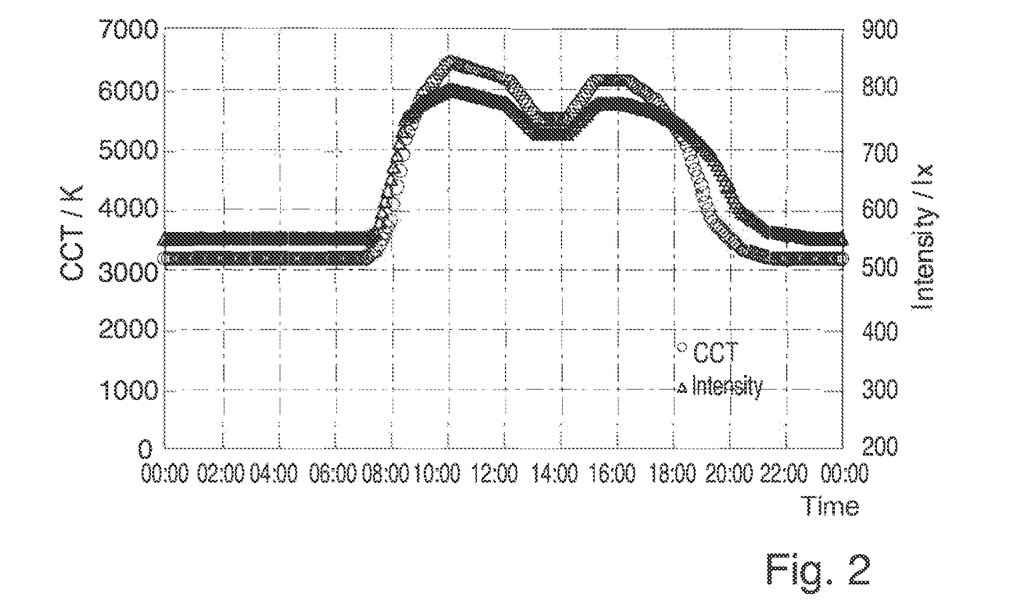
FIG. 2 shows a further predetermined sequence for intensity and color temperature.

Alternatively, the predetermination of additional support points for a more precise graduation is possible, as illustrated in FIG. 2. Then the interpolation can be omitted.

In FIGS. 1 and 2 and also in FIGS. 3 to 7, which are described below, in each case the color temperature is shown in Kelvin (K) on the left and (except for FIG. 3) the illumination intensity is shown in lux (lx) on the right. The sequences can be stored directly in the control device as such physical parameters, but also as other values, from which physical parameters can be calculated.

In one embodiment, the times that define support point can be changed as a function of astronomical data (for example time, sunrise and sunset times, geographical location). This can take place manually or automatically under program control. Thus, for example, the time at which the increase in illumination intensity and color temperature begins in the morning can be automatically adapted to the sunrise time.

The predetermined time sequence S of a light parameter X can be expressed as $S_{X,0}(t)$. For example, the predetermined time sequence of the intensity (or illumination intensity) can be expressed as $S_{B,0}(t)$ and the predetermined time sequence of the color temperature can be expressed as $S_{T,0}(t)$. If astronomical data are taken into consideration, as described above, different functions are produced for different days in the year and different geographical locations.

Until now a dynamic lighting control without user intervention has been described, corresponding to the current state of the art. This time-dependent control of color temperature and brightness can be changed by further overlaid functions. In this case the support points for illumination intensity and color temperature, which originally determine for each time t a fixed initial or basic setting for illumination intensity $S_{B,0}(t)$ and color temperature $S_{T,0}(t)$, are changed for each time according to an overlaid function. These overlaid functions can be defined by external signals such as, for example, user interfaces or sensors. However, parameters such as time of days or season can be included therein.

Thus, the user can perform individual interventions in the system and can change the pre-defined settings.

This allows the user to change the setting for illumination intensity and color temperature corresponding to the functions $f_T(t,x)$ for the color temperature and $f_B(t,x)$ for the illumination intensity which are overlaid on it.

Thus, for the changed settings $S_B(t,x)$ and $S_T(t,x)$ for illumination intensity and color temperature at the time t, the following equations are produced:

$$S_B(t,x)=S_{B,0}(t)\cdot f_B(t,x)$$

$$S_T(t,x)=S_{T,0}(t)\cdot f_T(t,x)$$

In this case, the parameter x stands for a value which can be calculated from various different parameters. In this case, x can be determined primarily or exclusively by a setting selected by the user on a user interface, such as for example a desired adjustment to higher or lower values. However, x can also be influenced by an external sensor which in the absence of the user takes the basic setting to low values down to zero, or which takes the brightness back as a function of the availability of daylight.

In this case, it is significant that the adjustment of the basic setting does not only change the instantaneous value statically, but changes the entire profile of the light dynamics for each time t.

Figure 3A:
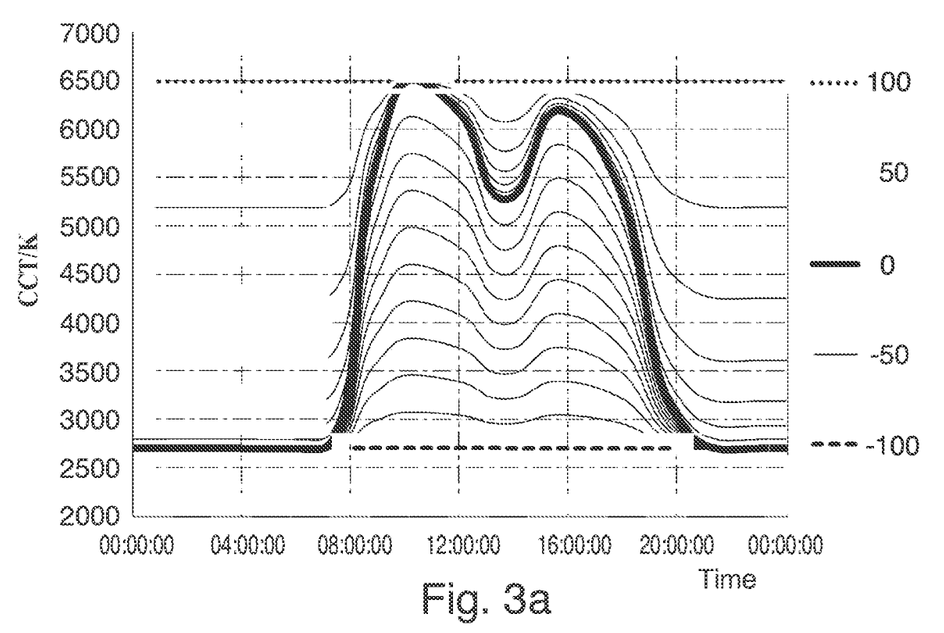
FIGS. 3a, 3b, 3c show further examples for predetermined sequences as well as sequences of maximum and minimum values for the color temperature and the illumination intensity.

This is illustrated by way of example for the color temperature in FIG. 3a. The basic setting is shown there as a bold solid line, corresponding to a user input of 0. The maximum value which in this case is limited by the technical possibilities of the lighting system is represented as a dotted line at 6500 K. Correspondingly, the minimum value at 2700 K is represented as a broken line.

For user inputs from −100 to +100 the resulting sequences for the color temperature are illustrated as an array of curves.

In this case the scope of the possibility for adjustment, i.e. how far the setting of the lighting system may deviate from the basic setting $S_{X,0}(t)$ or which minimum and maximum values are permissible, can be restricted within specific limits.

These limits are usually provided by the technical possibilities of the lighting system, for example maximum intensity of a light fixture or technically possible range for the color temperature. In one embodiment, these technical limits can be further restricted, in that for the maximum and minimum setting values for illumination intensity and color temperature in each case one or two threshold functions are defined, which define maximum and/or minimum values for color temperature and for illumination intensity as a function of the time of day t.

Alternative or additional boundaries are also conceivable which are fixed as a function of other parameters such as the season or characteristics of user groups.

Figure 3B:
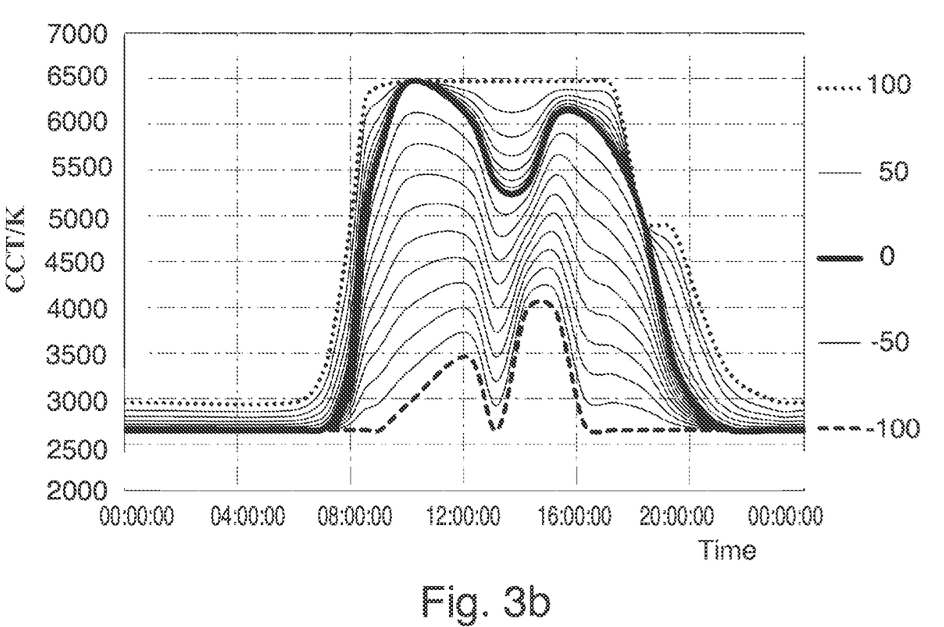

Accordingly FIG. 3b shows the basic setting, i.e. the predetermined sequence using the example of the color temperature as a bold solid curve, corresponding to a user input of 0, as a function of the time of day. The upper, dotted curve shows by way of example a threshold function for the maximum color temperature which can be set at a specific time. In this case the maximum value of approximately 6500 K is dictated technically, but in the morning and evening hours the maximum color temperature is further limited to lower values.

Correspondingly, the lower curve as a broken line shows the minimum color temperature which can be set. In this case in the illustrated case the minimum value of approximately 2700 K occur is dictated technically, but in the daytime the minimum color temperature is temporarily limited to higher values. Furthermore, color temperature sequences which can result from user inputs between −100 and +100 are illustrated, by way of example, in FIG. 3b.

Figure 3C:
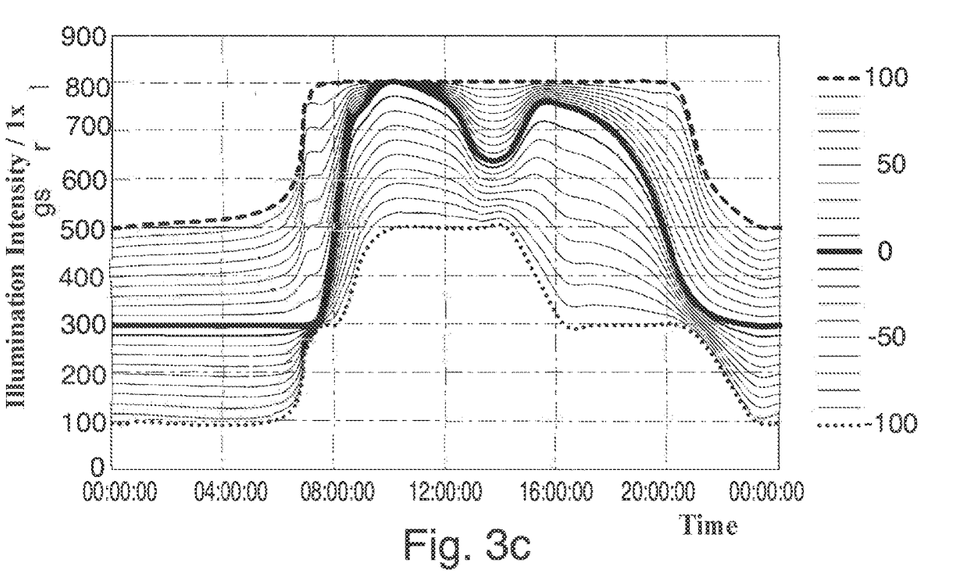

In FIG. 3c, as a further example, a predetermined sequence (bold solid line) and an upper (broken line) and lower (dotted line) limit sequences for the illumination intensity are illustrated. These can have a different characteristic than the sequences of the color temperature. Nevertheless, they react to the same user input to which the sequence of the color temperature also reacts.

The precise sequence of these color temperature or intensity sequences depends upon the definition of the functions $f_T(t,x)$ and $f_B(t,x)$ and is shown merely by way of example in FIGS. 3a, 3b and 3c.

The threshold functions can be used to limit the changeability of the light setting. For example, it is expedient in the evening not to allow very high values for the color temperature, in order to minimize possible disruptions of the circadian rhythms of the user and a negative influence on sleep.

Accordingly, for example, also a minimum illumination intensity $S_{B,min}(t)$ can be defined, so that $S_B(t,x)>=S_{B,min}(t)$ applies for all times or at least for specific times.

Thus, in one embodiment, during the day a maximum color temperature of 6500 K is permitted, if the system technically allows it. In the evening after 21:00 the maximum value of the color temperature $S_{T,max}(t)$ for t>21:00 is limited to 4000 K. If the basic setting, i.e. the predetermined sequence of the color temperature $S_{T,0}(t)$ for this time provides a color temperature of 2700 K, in this example a maximum color temperature of 4000 K can thus also be achieved by user interventions. This allows the restriction of user interventions to settings which have been defined as expedient.

Usually for a biologically "expedient" setting during the day a high color temperature and high illumination intensity are normally selected as the basic setting; for the evening and the night a low color temperature and a lower illumination intensity are used.

Such threshold functions can be programmed in as predetermined "expedient" functions in the lighting system and/or can also be configured during the start-up or by experienced users.

For the restrictions for minimum and maximum values of color temperature and/or illumination intensity, in addition to the time of day further parameters can also be taken into consideration. Thus, a sensor for daylight or for the presence of persons can give an additional signal which reduces the maximum intensity which is emitted by the light fixtures.

Furthermore, further functions can also be defined, which exclude specific settings or combinations of settings. Thus, combinations of very high color temperature at the same time as low illumination intensity are not expedient, because they are perceived as unpleasant by the user. For example, therefore the maximum color temperature $T_N$ can be defined as a function of the set illumination intensity B. In one embodiment, this can take place as follows:

$$T_N<=10\cdot B \text{ with } T_N \text{ in } K, B \text{ in Lux for } B>270 \text{ lx and}$$
$$T_N=2700 \text{ K for } B<=270 \text{ lx}$$

For input of a required deviation from the predetermined sequence of the light parameters, an input device (also called a user interface or operating element) is preferably used. In one embodiment, an operating element allows a deviation from the initial setting $S_{B,0}(t)$ and $S_{T,0}(t)$ described above which is one-dimensional, that is to say only in two directions which are designated below as "up" and "down".

The operating element can be a rotary knob, a slider, a push button with an "up" and a "down" function, or a comparable element, which really exists or is arranged virtually on the operating panel of a user interface. A key feature is that the input unit emits only one one-dimensional parameter, for example a number of units in the "up" or "down" direction, but because of the stored functions this one-dimensional parameter affects the deviation from the basic setting for illumination intensity and color temperature.

A setting E of the operating element therefore corresponds to a change required by the user for the predetermined sequences (control curves) for color temperature and illumination intensity. The setting of the operating element does not act directly on the color temperature and illumination intensity of the light fixtures of the lighting system, but on the functions which describe color temperature and illumination intensity. Thus, the same changes to the setting E can have different effects on the actual change of color temperature and illumination intensity, for example as a function of the time of day. Since further parameters can participate in the function for changing the basic setting, complex dependencies can be implemented. Thus, it is conceivable that at specific times of day changes to the color temperature are restricted in one or the other direction, or that, as a function of the current basic settings, required changes by the user affect the color temperature and the illumination intensity to a different extent.

The actuation of the "up" function (for example, turning a rotary knob in a clockwise direction) can effect a change of illumination intensity and/or color temperature to higher values. When the "down" function is actuated, the change to lower values can accordingly take place.

The degree of change V for the illumination intensity B and color temperature T can be defined in different functions $V_B = f_B(E,t,x)$ and $V_T = f_T(E,t,x)$, which are determined inter alia by the setting E of the operating element.

The setting E can correspond to the position of a slider or rotary switch. It can also correspond to the number of emitted pulses or the rotational speed of a rotary encoder, or a differently input or calculated value (for example by a gesture or a sensor, or another way) for the extent of an adjustment required by the user or oriented to his requirements.

This also includes automatically generated values for the setting E, which for example can originate from a brightness sensor or presence sensor or can be calculated from user data or the like.

For the new settings for illumination intensity and color temperature the following applies for example $S_B(t) = S_{B,0}(t) + V_B$ and $S_T(t) = S_{T,0}(t) + V_T$ For the example of illumination intensity, in this example the function would be described according to the definition as described above $f(t,x) = 1 + V_B / S_{B,0}(t)$ and $S_B(t,x) = S_{B,0}(t) \cdot (1 + V_B / S_{B,0}(t))$ Further parameters which can participate in the functions $V_B$ and $V_T$ may be the following:

The time t, which can be determined by local time and season.

The time at which a preceding change was carried out. With this information it is possible to limit the time for which a specific change is retained. Thus, for example, the change that a user sets is only effective for a specific time and thereafter goes back again to the basic setting.

Any further parameters which are symbolized by "x" in the formula above. In one embodiment this can be the difference between the basic setting $S_{B,0}(t)$ or $S_{T,0}(t)$ to the respective maximum value or minimum value for illumination intensity and color temperature of the lighting system. Thus, for example, an input for changing the direction towards lower values has a stronger effect on lowering the color temperature if this latter is set relatively high, and only in the event of further reduction of the setting E value a reduction of the illumination intensity is then implemented. Conversely, in the event of a corresponding input for reduction determined by the setting E value, with a high illumination intensity and average color temperature, the illumination intensity can first be reduced.

Experience shows that the combinations of low illumination intensities with high color temperature as well as high illumination intensities with low color temperature are perceived as unpleasant by users. Furthermore, high illumination intensities with low color temperature are also not expedient in terms of energy, since the same effect on the biological system can usually also be achieved with reduced illumination intensity and higher color temperature.

If the user makes changes, in a lighting system according to the disclosure these fundamental principles can be observed for the most part.

Thus, an input for change to higher values ("up") could initially have a stronger effect on the illumination intensity than on the color temperature. Only when the user inputs a change very strongly in the "up" direction, the color temperature also "follows suit".

Conversely, an input for lower values ("down") could initially relate to the color temperature if this latter is at a high basic level. The illumination intensity correspondingly "follows suit".

In the following examples, for the purpose of illustration, values between −100 and +100 are used as numerical values for the setting E. Values which exceed this or any other scaling are also conceivable. The setting of the operating element is transferred by an analogue or digital signal from the operating element to the controller.

The terms $S_T(t)$ and $S_B(t)$ for the settings of color temperature and illumination intensity are used here so that the setting and the value itself are used synonymously, even if internally in the control device a digital value is calculated which only corresponds to the light values. This may be, internally, a percentage, an 8-Bit or 16-Bit control value or the like.

The same applies to the color temperature, which internally in the control device or externally in the operating device of a light fixture can be converted into a representation as a color location x,y or as a ratio of pulse width modulation of two or more output channels of a light control systems.

In the following examples an illumination intensity $S_{B,0}(t_1) = 650$ lx and a color temperature of $S_{T,0}(t_1) = 5350$ K may be predetermined as a basic setting for a time $t_1$. For the illumination intensity and color temperature for the time $t_1$, $S_{B,min}(t_1) = 300$ lx and $S_{T,min}(t_1) = 2700$ K may be defined as minimum values and $S_{B,max}(t_1) = 800$ lx and $S_{T,max}(t_1) = 6500$ K may be defined as maximum values.

A user intervention with a required adjustment of the setting E=+50 can be dealt with as follows:

a) "Linear" Reaction:

In this example the illumination intensity and the color temperature are changed proportionately to the setting E. In this case it may be predetermined that a change of the setting E by 1 corresponds to a change to the color temperature by 20 K: $V_T(t_1,1)=20$ K. Thus a change of the setting E by 50 corresponds to $V_T(t_1,50)=1000$ K. In this example this may apply for all times t and the dependence of change V and the setting E may be linear. Then the following is obtained for the changed color temperature $$S_T(t_1) = MIN[S_{T,0}(t_1) + V_T(t_1, 50), S_{T,max}(t1)] ==$$
$$MIN[(5350 \text{ K} + 1000 \text{ K}), 6500 \text{ K}] == 6350 \text{ K}.$$

For the illumination intensity, it may be predetermined that a change of the setting E by 1 corresponds to a change to the illumination intensity by 4 lx: $V_B(t_1,1)=4$ lx. Thus, a change of the setting E by 50 corresponds to $V_B(t_1,50)=200$ lx. In this example this may also apply for all times t and the dependence of V and the setting E may be linear. Then the following is obtained for the changed illumination intensity $$S_B(t_1) = MIN[S_{B,0}(t_1) + VB(t_1, 50); S_{B,max}(t_1)] ==$$
$$MIN[(650 \text{ lx} + 200 \text{ lx}); 800 \text{ lx}] == 800 \text{ lx}$$

In this simple example, maximum or minimum values are achieved relatively quickly. The fundamental curve shape of the dynamic curve S(t) is changed as a result. Maximum or minimum values are achieved earlier and are maintained for longer times. More complex dependencies are not provided here.

Figure 4:
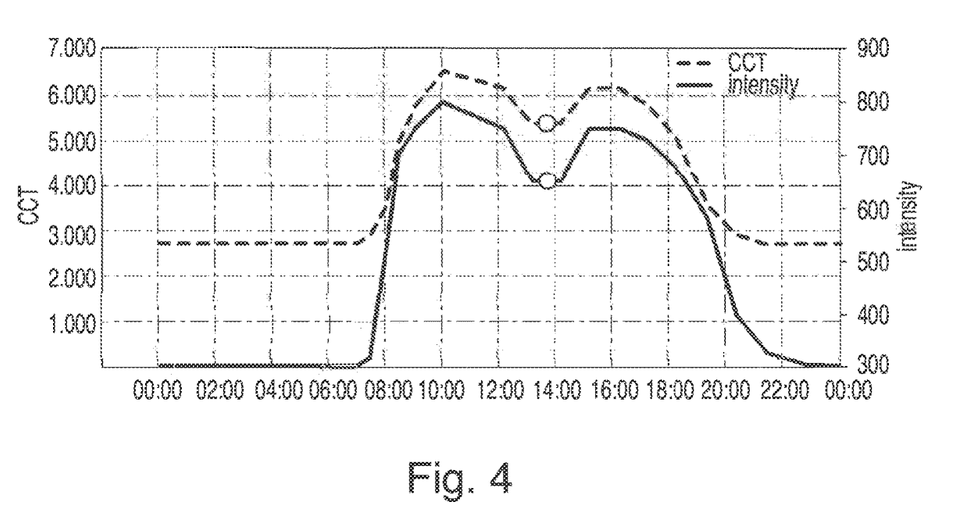
FIG. 4 shows a further predetermined sequence for intensity and color temperature.
Figure 5:
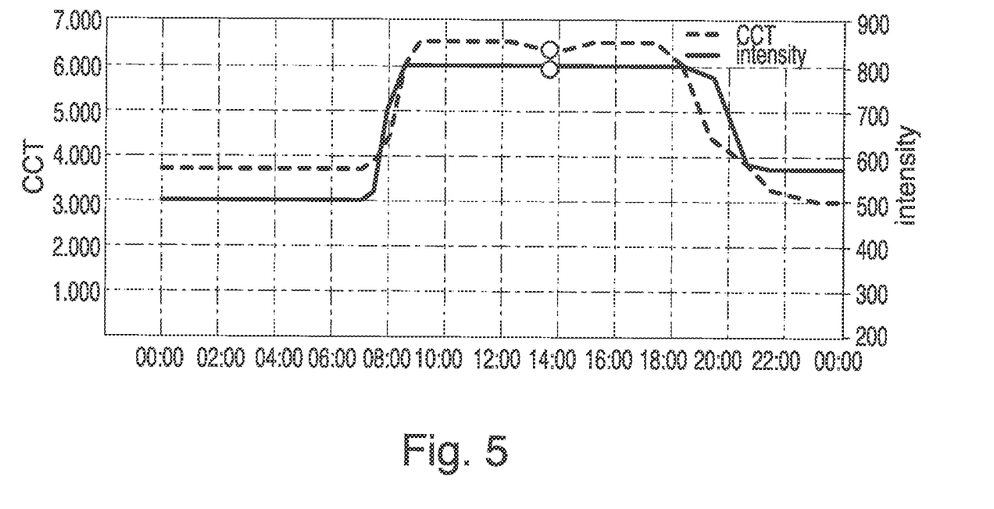
FIG. 5 shows a changed sequence for intensity and color temperature.

For the above example a), the predetermined sequence for color temperature and illumination intensity is illustrated in FIG. 4 and the changed sequence of these light parameters for a change to the user input by +50 is illustrated in FIG. 5.

b) Linear Reaction with Finer Graduation:

In this example a change of the setting E=1 corresponds to a change of 1% of the difference between the value for the basic setting $S_{T,0}(t_1)$ and the maximum value $S_{T,max}(t_1)$. In contrast to the above example, the maximum value for the time $t_1$ may be limited to 6000 K. Then a change to the setting E by 1 corresponds to a change to the color temperature $V_T(t_1,1)$ by 1% of the difference 6000 K−5350 K=650 K, that is to say by 6.5 K. Thus $V_T(t_1,50)=325$ K and $$S_T(t_1) = MIN[S_{T,0}(t_1) + V_T(t_1, 50); S_{T,max}(t1)] ==$$
$$MIN[(5350 \text{ K} + 325 \text{ K}); 6000 \text{ K}] == 5675 \text{ K}.$$

With corresponding predetermination for the change to the illumination intensity a change of the setting E by 1 corresponds to a change to the color temperature $V_B(t_1,1)$ by 1% of the difference 800 lx−650 lx=150 lx, that is to say by 1.5 lx. Thus $V_B(t_1,50)=75$ lx and $$S_B(t_1) = MIN[S_{B,0}(t_1) + VB(t_1, 50); S_{B,max}(t_1)] ==$$
$$MIN[(650 \text{ lx} + 75 \text{ lx}); 800 \text{ lx}] == 725 \text{ lx}.$$

By relating the required change to the difference between the value of the basic setting and the maximum value at the time $t_1$ the setting E is more finely graduated, and the fundamental curve shape is maintained. Rather, the sequence is expanded or compressed. Minimum or maximum values are achieved at the same times as before the user intervention.

Figure 6:
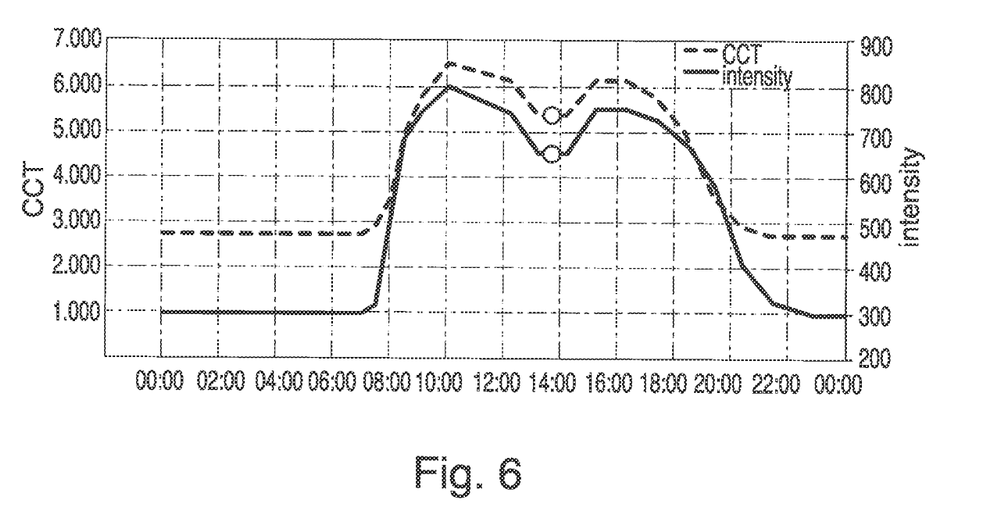
FIG. 6 shows a further predetermined sequence for intensity and color temperature.
Figure 7:
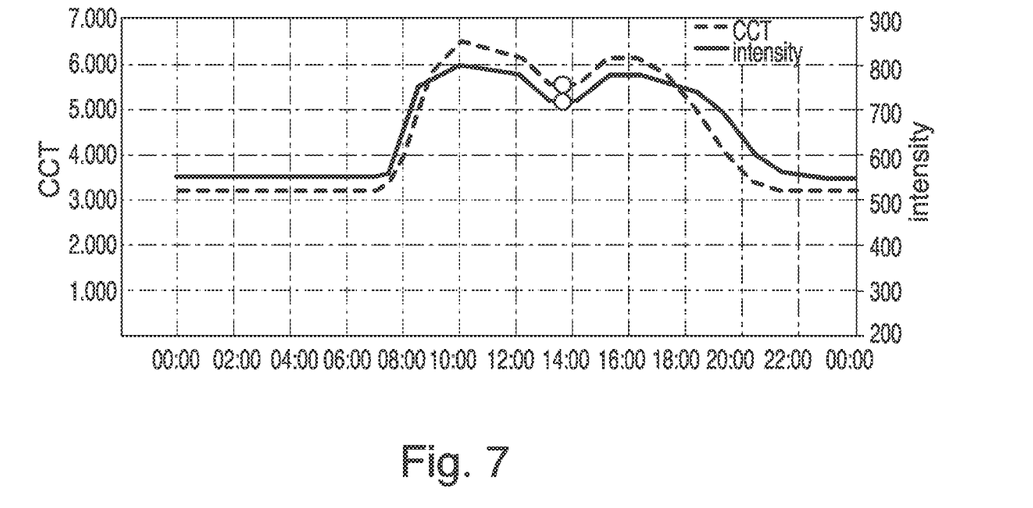
FIG. 7 shows a further changed sequence for intensity and color temperature.

For the above example b), the predetermined sequence for the color temperature and the illumination intensity is illustrated in FIG. 6 and the changed sequence of these light parameters for a change to the user input by +50 is illustrated in FIG. 7.

Any other functions for the association of the setting E to changes V are conceivable. Preferably, such changes in which the relationship between the setting E and the change V for illumination intensity and color temperature is described by a monotonically increasing operation, i.e. in the event of increasing values of the setting E the illumination intensity and/or the color temperature likewise increase or are at least maintained. Conversely, with falling values of the setting E the illumination intensity and/or color temperature also fall or are at least maintained.

In this case, negative values of the setting E corresponds to a reduction of the illumination intensity and/or color temperature according to the examples a) and b), but in the other direction.

c) Complex (Non-Linear) Reaction:

In this example, the special features with regard to non-visual effects are taken into consideration, the illumination intensity changes according to linear functions as described in example b), whilst the color temperature changes according to a non-linear function.

With the exemplary settings which are used in the example b), the following functions could be defined. For the illumination intensity $V_B(t_1,50)=75$ lx and $S_B(t_1)=725$ lx may apply identically to example b).

For the color temperature a dependence upon the 3rd power of the setting E is defined:

$$V_T(t_1,E)=(E/100)^3 \cdot (S_{T,max}(t_1)-S_{T,0}(t_1))$$

Thus, for the setting E=50 the following is obtained:

$$V_T(t_1,50)=0.5^3 \cdot (6000 \text{ K}-5350 \text{ K})=0.125 \cdot 650 \text{ K}=81 \text{ K}$$

and thus $S_T(t_1)=5350$ K+81 K=5431 K.

In particular in the evening, when the system in the basic state is set to low color temperatures, such a dependence makes it possible initially to make relatively little change to the color temperature, while the illumination intensity is significantly changed. Only when the setting value for the change preselected by the user approaches the possible maximum of 100% (E=100) is the effect on a change to the color temperature stronger.

In the case of a reduction of the setting values relative to the basic setting, a correspondingly reversed behavior can be implemented, so that the change initially has a stronger effect on the color temperature and only later on the illumination intensity.

A minimum illumination intensity is preferably defined which is always kept as a minimum value so that sufficient quality of vision is ensured. In work environments, such as offices or conference rooms, this minimum value can be predetermined by standards. The value of $S_{B,min}(t)$ should correspond to this minimum value. In the "normal" dynamics—even after user intervention—as described above this minimum value is not undershot.

In many cases, however, it may be desirable to set a further reduced brightness, for example when a relaxed mood is to be set in a room, or when only a very low brightness is required, for example in order to watch a film or a presentation.

In this case, if a maximum reduction of illumination intensity and color temperature down to the minimum values described above has already been achieved, a further actuation of the "down" function can be seen as a wish by the user to go beyond this "minimum value" to the extent of switching off the illumination, corresponding to a dimmer function. In this case, with the minimum color temperature kept constant the illumination intensity can be further reduced.

Since the settings themselves and the changes for the settings are not immediately apparent for the user, it may be expedient to give the user a feedback message as to what the changed settings can implement and what changes he can expect for the current light settings and those coming later.

For the user such a change can be displayed, for example, graphically by a diagram which shows the changed sequence of illumination intensity and color temperature, optionally by comparison with the predetermined sequence.

Such diagrams are usually very complex and not necessarily easily understood. Therefore the following examples describe how a display shows the sequence in simplified form.

Such a display can preferably take place directly on the input device, so that during the change of the one-dimensional user setting the user has the effects directly in view. In particular the input device can have a touch-sensitive display device on which the user makes the required change by touch.

Figure 8A:
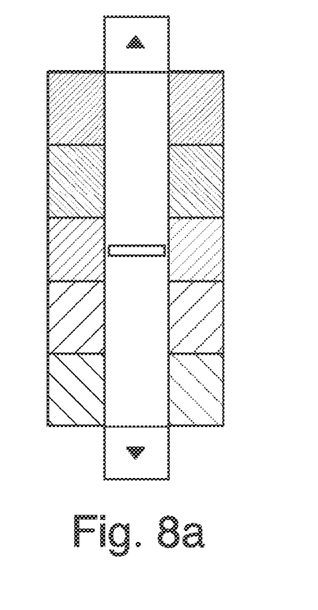
FIGS. 8a, 8b, 8c, 8d, 8e show different embodiments of the graphical representation of the value of the one-dimensional user setting.

In one embodiment, the display takes place by a bar chart (horizontal or vertical), on which the setting just selected for the one-dimensional user setting is highlighted. Such a bar chart can, for example, display the value for the one-dimensional user setting with color coding, as illustrated schematically in FIG. 8a. In this case, for the "normal setting", i.e. for a dynamics according to the predetermined sequence, a "neutral" shade as white or light yellow can be used. Raised values for the one-dimensional user setting can be indicated by shades of blue (for example light blue to dark blue or pale blue to strong blue) and lowered values can be indicated by shades of red and/or orange (for example yellow to red). Such a display can take place (more or less) in an analogous, i.e. continuously variable, manner.

Alternatively or in addition, the display can also have categories which, for example, represent the corresponding light situation. These categories can be given using words, as illustrated schematically in FIG. 8b. In the embodiment according to FIG. 8b this is for example "HCL Daylight" for the predetermined sequence (i.e. without any deviation input by the user) as well as "Work Late" and "Performance Boost" for raised values of the one-dimensional user setting. For lowered values in this embodiment "CREATIVE" and "RELAX" are used. Obviously, other terms and also more or fewer terms can also be used In the embodiment according to FIG. 8c the categories are illustrated by symbols. Here too, other symbols and also more or fewer symbols can be used. A mixture of symbols and words can also be used.

Figures 8B, 8C:
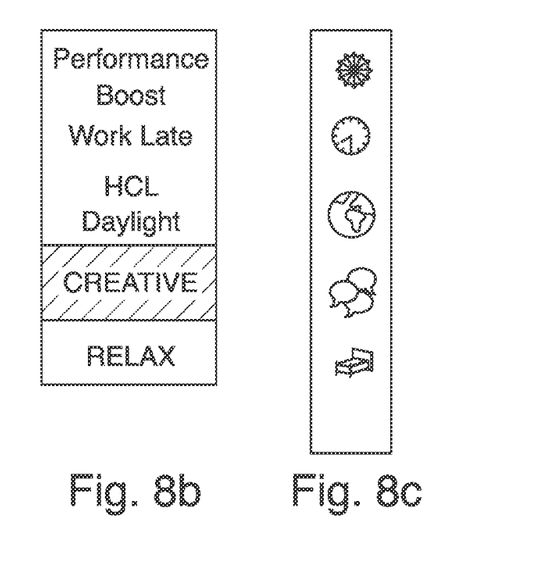
Figure 8D:
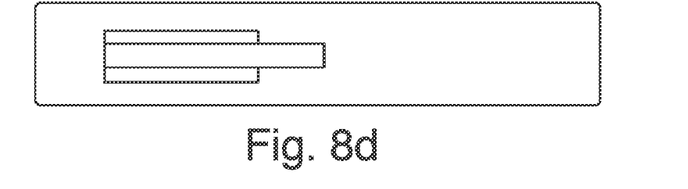

A different type of representation is illustrated schematically in FIG. 8d. Here the current values of illumination intensity and color temperature are shown on a scale, in this case as superimposed bar charts with different colors, for example yellow for the illumination intensity (narrow bar) and blue for the color temperature (wide bar). The bars can also be arranged below one another or adjacent to one another. The bars can also be in a ring.

A new value can be calculated from the values for the illumination intensity and color temperature according to a formula. This can take place, for example, by multiplication of the two values or also multiplication of the two values with respective constant factors and addition of the products.

From the color temperature, with a knowledge of the spectral distribution, a factor can be determined which describes the ratio of melanopic equivalent daylight illuminance according to DIN SPEC 5031-100:2015 to the visually evaluated illumination intensity.

In the case of a white LED illumination with 6500 K this factor is approximately 0.8. In the case of a warm white LED illumination with 3000 K this factor is approximately 0.45.

If the illumination intensity is multiplied by the conversion factor calculated according to this method, this produces the melanopic equivalent daylight illuminance according to DIN SPEC 5031-100.

Figure 8E:
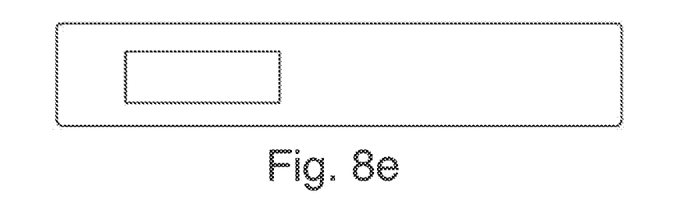

According to the present-day state of knowledge, this value is a measure of the effectiveness of the light on the biological system at a specific illumination intensity and a specific color temperature. This value can also be displayed on a scale. This embodiment is shown schematically in FIG. 8e. Here too, in addition to a linear representation the representation as a ring-shaped bar or in the form of a tacho display is also conceivable.

Figure 9:
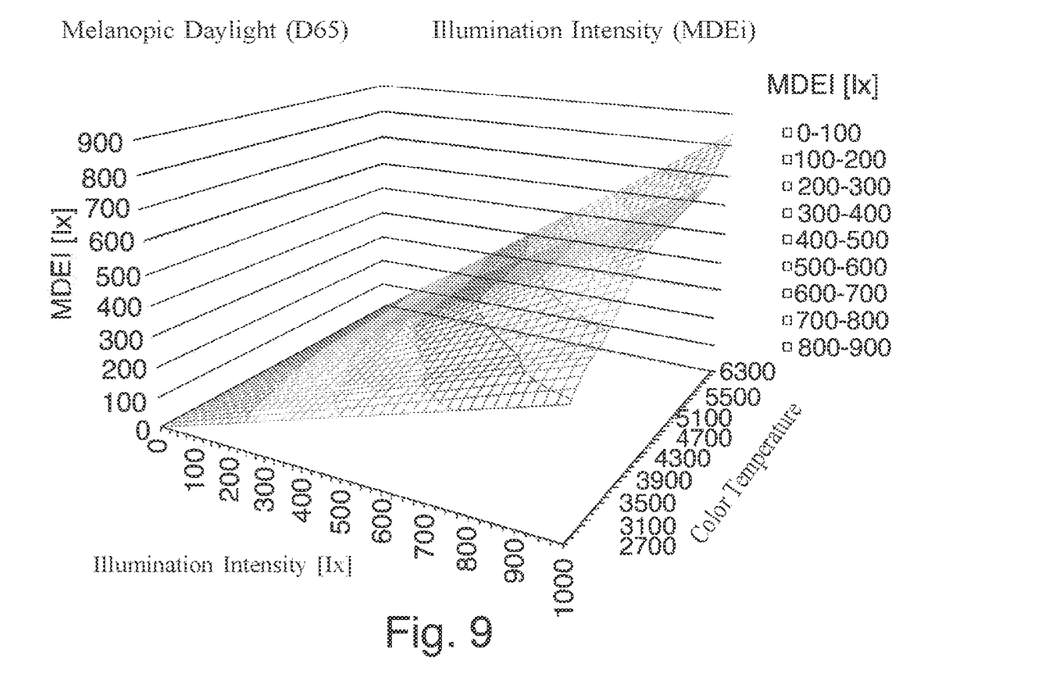
FIG. 9 shows an example for the dependence of the melanopic daylight equivalent illumination intensity upon the illumination intensity and the color temperature.

The dependence of the melanopic equivalent daylight illuminance upon the illumination intensity and the color temperature is shown approximately in FIG. 9 for the example of LED lighting.

Figure 10A:
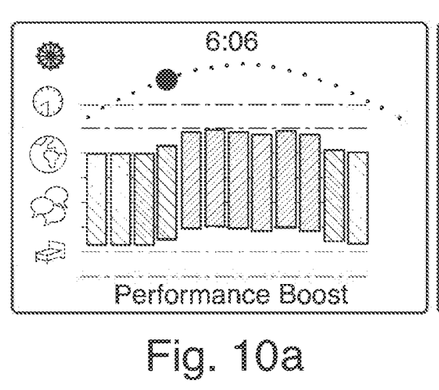
FIGS. 10a, 10b, 10c, 10d, 10e show an embodiment of the graphical representation of the predetermined sequence and different changed sequences for intensity and color temperature.
Figure 10B:
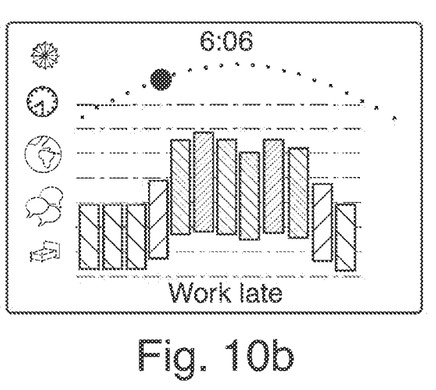
Figure 10C:
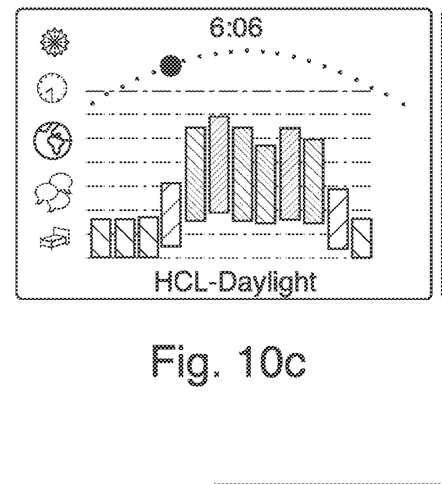
Figure 10D:
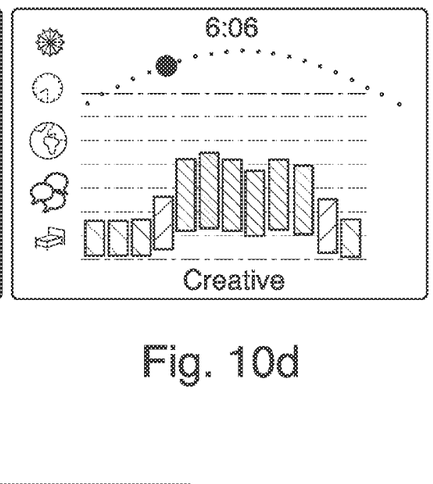
Figure 10E:
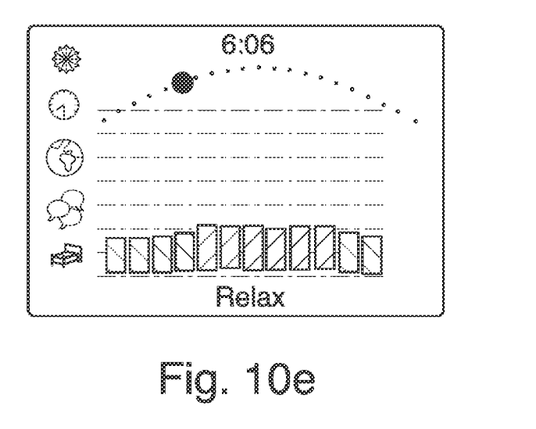

FIGS. 10a and 10e show a further type of display. Here, symbols for different values for the one-dimensional user input are shown on the left, comparable with FIG. 8c. The setting just selected or at least the symbol which is closest to the setting just selected can be shown highlighted. To the right of this then in each case the respective sequence of color temperature and illumination intensity is indicated on a horizontal time axis. In this case the color of the vertical bars can represent the color temperature at the respective time. For example, warm to neutral white light colors can be represented by orange-colored to yellow bars, and cold white light colors can be represented by light blue to strong blue bars.

The illumination intensity can be symbolized by the length of the bars.

Simultaneously the lower value of the bar can be determined by the color temperature. This makes it possible to symbolize that higher color temperatures have a higher non-visual effect.

In the illustrated examples a bar corresponds to the mean value from approximately 1.5 hours over the entire day. Thus the setting can be symbolized for the user. The current status can be displayed by a symbol (for example a sun symbol above the bar). It is possible for the user to see how the illumination situation is further changed.

A display of the sequence of color temperature and illumination intensity, in particular for the future values, can also take place in another way.

The symbols shown on the left in FIGS. 10a to 10e can correspond to the terms "Performance Boost", "Work Late", "HCL Daylight", "CREATIVE" and "RELAX" mentioned with regard to FIG. 8b.

The setting "Performance Boost" could also be designated as "boost", "performance-enhancing illumination", "concentration" or by terms with a similar meaning. This setting would be suitable for increasing concentration and efficiency in the short term, but it carries the risk of also having a negative influence on the user at the wrong time, for example by enhanced biological effects in the evening.

The possibility of choosing such a setting can be limited by definition of maximum values as described in detail above. Also a time limit for setting the "Performance Boost" setting can be defined—for example not after 22:00.

Likewise, the period of time for which the "performance boost" setting remains activated can be limited. Thus for example, if the "Performance Boost" setting is selected after 21:00 the value of setting E could be automatically reduced under program control every 2-3 minutes by a specific amount, until the "Work Late" setting (described below) is reached again.

An example of a changed sequence of the light parameters in the "Performance Boost" setting is illustrated in FIG. 10a. In FIGS. 3b and 3c these are the sequences which are close to the upper limit sequences.

The "Work Late" setting could also be designated as "evening working" or "concentration (without circadian disturbance)", "focused working" or the like. This setting, in which the illumination intensity is significantly increased beyond the predetermined starting setting, while the color temperature is not or only slightly raised, is suitable in order to work in the evening or at night without a considerable disruptive effect on the circadian system. However, it can also be used in the daytime in order to promote concentrated working.

An example of a changed sequence of the light parameters in the "Work Late" setting is illustrated in FIG. 10b. In FIGS. 3b and 3c these are the sequences which lie in the middle area between the predetermined sequence and the upper limit sequence.

The "HCL Daylight" setting could also be designated as "HCL mode", "daylight", "standard operation", "daylight dynamics", "natural illumination" or by similar terms which symbolize that the illumination is oriented substantially towards the natural daylight sequence.

An example of a changed sequence of the light parameters in the "HCL Daylight" setting is illustrated in FIG. 10c. In FIGS. 3b and 3c these are the sequences which lie close to the predetermined sequence.

The "CREATIVE" setting could also be designated as "creativity illumination" or the like. In studies it has been demonstrated that with warm white illumination creativity is higher than with standard illumination or raised color temperature. In specific cases it may be expedient, even during the day when a bright illumination similar to daylight is implemented as "standard HCL illumination", to deviate from this preset and to choose the "creativity setting", for example for carrying out creativity workshops, brainstorming or other activities in which an inspiring atmosphere which promotes creativity is needed more than one which promotes concentration and attentiveness.

As an example of a predetermined sequence of the light parameters, the "CREATIVE" setting is illustrated in FIG. 10d. In FIGS. 3b and 3c these are the sequences which lie in the middle area between the predetermined sequence and the lower limit sequence.

The "RELAX" setting could also be designated as "relaxation" or the like. Warm colors and a brightness which is reduced below the conventional "working level" promote the relaxation and enable a familiar atmosphere. Examples of applications are for example relaxed conversation in the afternoon or evening, but also a "Christmas mood" or the like.

An example of a changed sequence of the light parameters in the "RELAX" setting is illustrated in FIG. 10e. In FIGS. 3b and 3c these are the sequences which lie close to the lower limit sequence.

Although five discrete settings have been described above, it may be provided that the one-dimensional user input can also include values between these discrete settings. The resulting sequence of the light parameters can then be displayed in the examples according to FIGS. 10a to 10e in the bar chart. The plurality of possible user inputs on the one-dimensional scale can also be assembled into more than the aforementioned five groups or other designations.

Figure 11A:
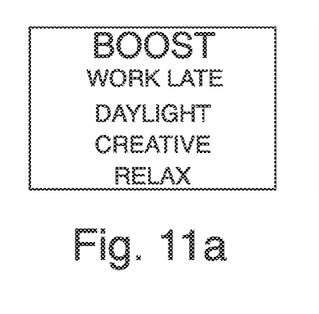
FIGS. 11a, 11b, 11c show a further embodiment of the graphical representation of the value of the one-dimensional user setting.
Figure 11B:
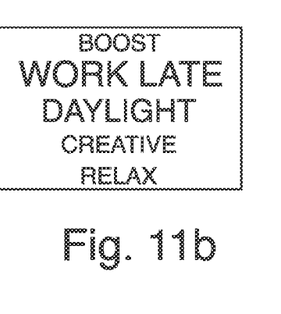
Figure 11C:
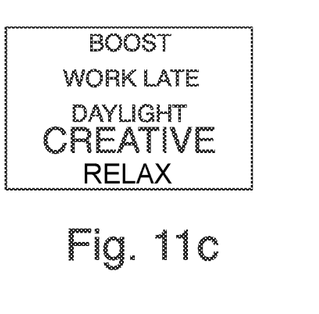

In a further embodiment the display of the one-dimensional user input can take place using words, wherein the size of the words symbolizes the set value. This is shown by way of example in FIGS. 11a to 11c.

The category corresponding to the selected setting can be displayed in a larger font size than adjacent settings and more remote settings.

The font sizes can be finely graduated in many steps, adapted quasi-analogously to the setting selected by the user. The drawings 11a to 11c show, by way of example, three displays out of a possible large number of images for feedback of the setting to the user. In this case the representation according to FIG. 11a corresponds to a "Boost" setting. The representation according to FIG. 11b corresponds to a setting between "Daylight" and "Work Late". The representation according to FIG. 11c corresponds to the "Creative" setting with a slight tendency towards "Relax".

Figure 12A:
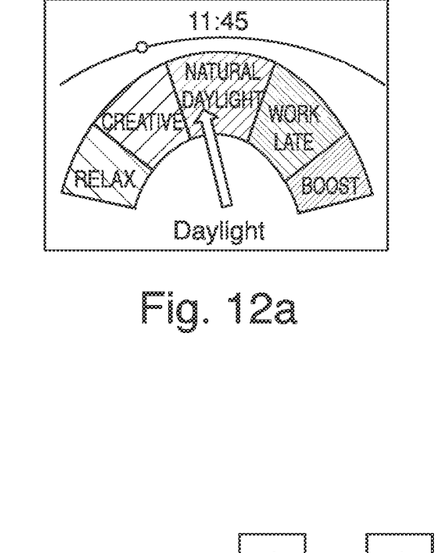
FIGS. 12a, 12b show further embodiments of the graphical representation of the value of the one-dimensional user setting combined with a quasi-analogous representation of the user setting as an arrow.
Figure 12B:
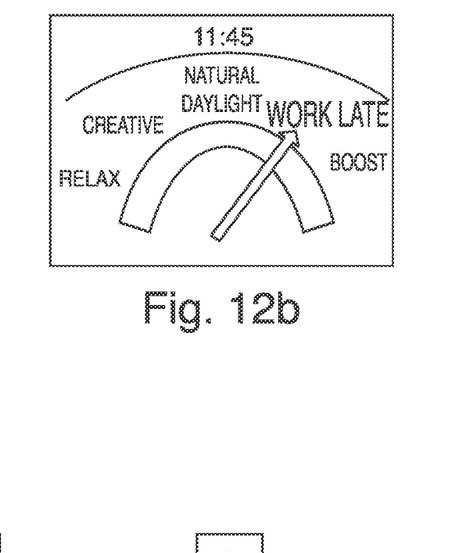

A further type of representation is shown schematically in FIGS. 12a and 12b. Here the current value of the one-dimensional user input is illustrated on a curved scale by an arrow. The characterization of the set value can be displayed in a similar manner to that described above in addition to the illustrated terms by colors and/or font sizes.

Figure 13:
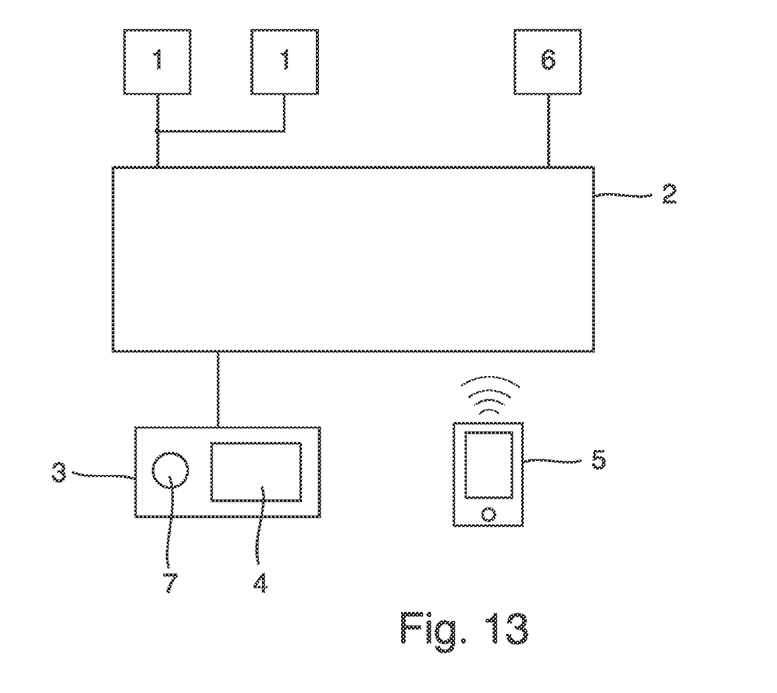
FIG. 13 shows schematically an embodiment of a lighting system according to the disclosure.

An embodiment of a lighting system according to the disclosure is illustrated schematically in FIG. 13. The lighting system has one or more light fixtures 1 (two light fixtures 1 are shown here) and a control device 2 for adapting light parameters of the light fixtures 1 in operation. The light fixtures 1 are connected by cables to the control device 2. However, a wireless connection can also be provided.

Furthermore, the lighting system has an input device 3, in which a display device 4 and a knob 7 are integrated. A one-dimensional user setting can be selected and transmitted to the control device 2 by the knob 7 of the input device 3. The input device 3 is connected by cables to the control device 2. However, a wireless connection can also be provided.

In some embodiments a setting of the one-dimensional user preset can take place, also or exclusively, by a program running on a mobile device 5 (for example smartphone or tablet). The mobile device 5 can communicate with the control device by wireless radio protocols.

Furthermore, the lighting system has one or more sensors 6 which for example detect the brightness or the presence of persons and transmit this to the control device. The sensors 6 are connected by cables to the control device 2. However, a wireless connection can also be provided.

Although the disclosure has been illustrated and described in greater detail by the depicted exemplary embodiments, the disclosure is not restricted thereto and other variations can be deduced therefrom by the person skilled in the art without departing from the scope of protection of the disclosure.

In general "a" or "an" may be understood as a single number or a majority, in particular in the context of "at least one" or "one or more" etc., provided that this is not explicitly precluded, for example by the expression "precisely one" etc.

Also, when a number is given this may encompass precisely the stated number and also a conventional tolerance range, provided that this is not explicitly ruled out.

If applicable, all individual features which are set out in the exemplary embodiments can be combined with one another and/or exchanged for one another, without departing from the scope of the disclosure.

LIST OF REFERENCES 1 light fixture
2 control device
3 input device
4 display device
5 mobile device
6 sensors
7 knob

What is claimed is:

1. A lighting system comprising:
   at least one light fixture having at least one light parameter; and
   a control device configured to control the at least one light parameter according to:
      a first function which provides time-dependent control of the at least one light parameter based on a plurality of defined support points which, at defined times (t), predetermine associated values for the at least one light parameter; and
      a second function which is overlaid on the first function and which provides control of the at least one light parameter based on an external signal, wherein the plurality of support points are changed for each time (t) according to the second function overlaid thereon.

2. The lighting system according to claim 1, wherein the first function and the second function operate to change both an instantaneous value of the at least one light parameter statically and a profile of light dynamics of the lighting system for each time (t).

3. The lighting system according to claim 1, wherein the control device is further configured to reset the change to the plurality of support points after a predetermined first period.

4. The lighting system according to claim 3, wherein the reset varies with time over a predetermined second period.

5. The lighting system according to claim 1, wherein the control device is further configured to retain the change to the plurality of support points in a manner dependent on a predetermined period.

6. The lighting system according to claim 1, wherein:
   the at least one light parameter comprises illumination intensity; and
   the first function, expressed as $S_{B,0}(t)$ for illumination intensity, and the second function, expressed as $f_B(t,x)$ for illumination intensity, operate to provide a changed setting for the illumination intensity, expressed as $S_B(t,x)$, according to the following relationship: $S_B(t,x)=S_{B,0}(t) \cdot f_B(t,x)$.

7. The lighting system according to claim 1, wherein:
   the at least one light parameter comprises color temperature; and
   the first function, expressed as $S_{T,0}(t)$ for color temperature, and the second function, expressed as $f_T(t,x)$ for color temperature, operate to provide a changed setting for the color temperature, expressed as $S_T(t,x)$, according to the following relationship: $S_T(t,x)=S_{T,0}(t) \cdot f_T(t,x)$.

8. The lighting system according to claim 1, wherein the at least one light parameter is selected from the group consisting of:
   illumination intensity;
   color temperature;
   transmission direction; and
   transmission angle.

9. The lighting system according to claim 1, wherein the at least one light parameter comprises both illumination intensity and color temperature.

10. The lighting system according to claim 1, wherein the external signal is from a user interface.

11. The lighting system according to claim 10, wherein the external signal includes an input value indicative of at least one of a time of day and a date.

12. The lighting system according to claim 10, wherein the external signal includes an input value that lies between a lower limit value and an upper limit value.

13. The lighting system according to claim 12, wherein at least one of the lower limit value and the upper limit value is a function of time (t).

14. The lighting system according to claim 1, wherein the external signal is from a sensor.

15. The lighting system according to claim 14, wherein the external signal includes an input value indicative of a detected presence of an occupant within a region illuminated by the at least one light fixture.

16. The lighting system according to claim 14, wherein the sensor is external to the at least one light fixture.

17. The lighting system according to claim 1, wherein the defined times (t) correspond with a time of day or a time of season.

* * * * *